Figure 4:
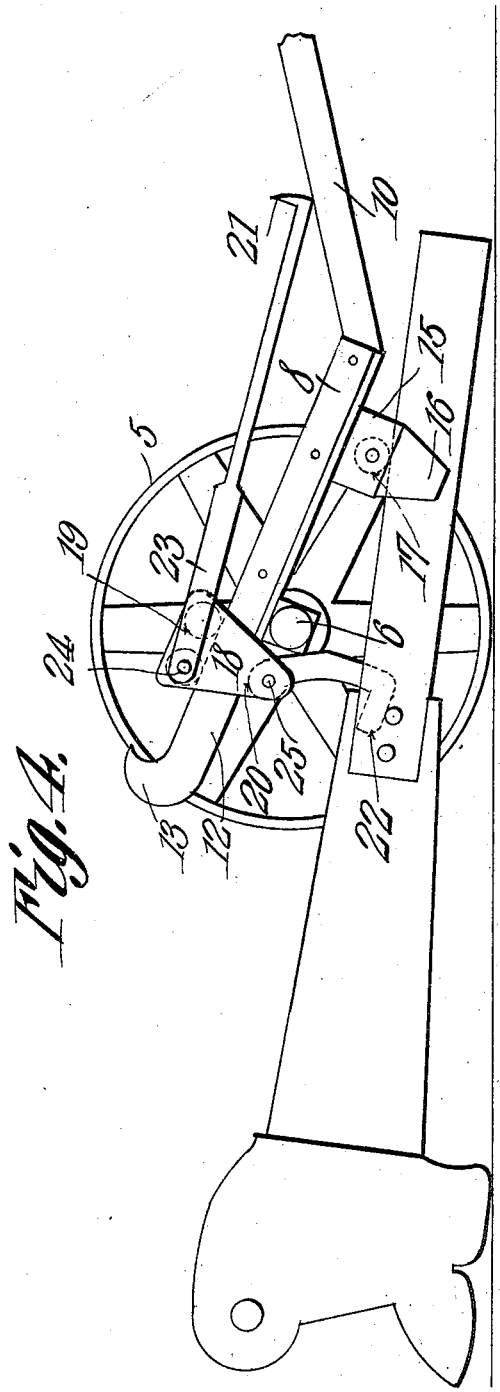

J. B. BROWN.
TRUCK.
APPLICATION FILED NOV. 28, 1908.
935,139.
Patented Sept. 28, 1909.
2 SHEETS—SHEET 1.
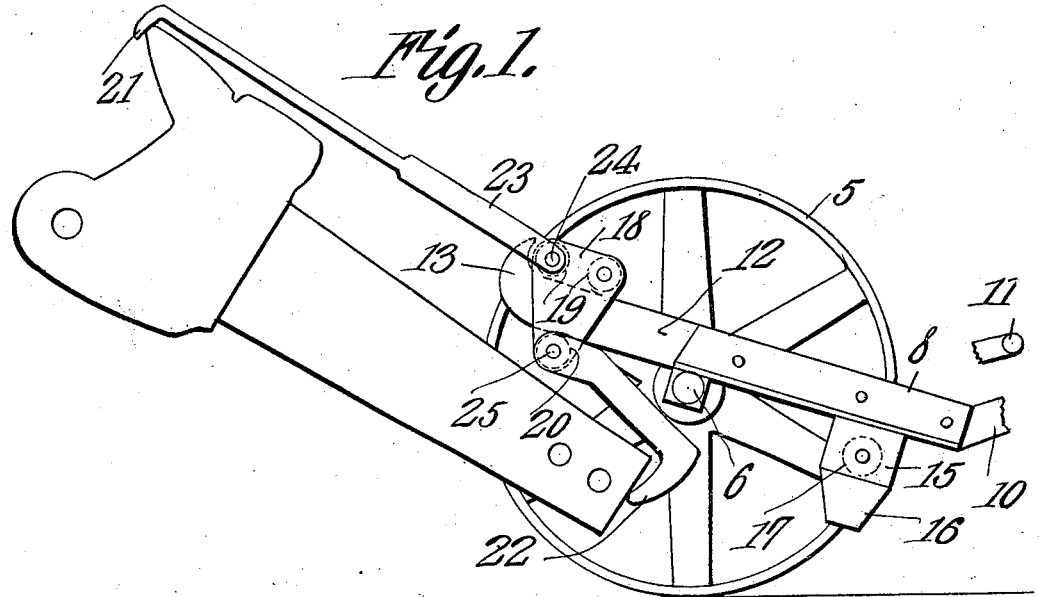
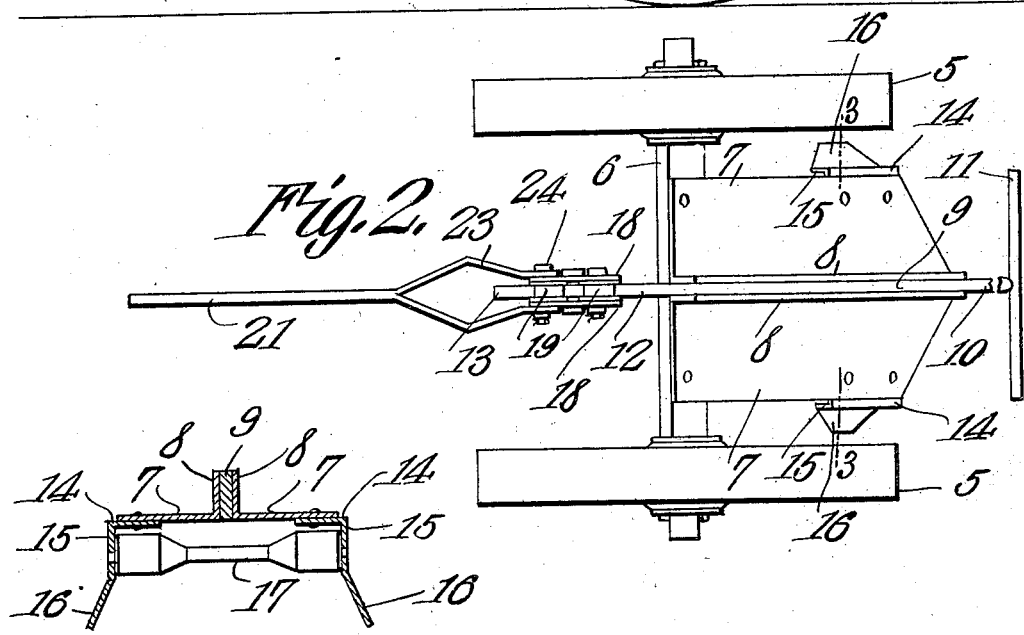
Witnesses
Inventor
Jesse B. Brown.
By C. A. Snow & Co.
Attorneys

J. B. BROWN.
TRUCK.
APPLICATION FILED NOV. 28, 1908.

935,139.

Patented Sept. 28, 1909.
2 SHEETS—SHEET 2.

Witnesses
E. F. Stewart
M. A. Schmidt

Inventor
Jesse B. Brown.
By C. A. Snow & Co.
Attorneys

UNITED STATES PATENT OFFICE.

JESSE B. BROWN, OF NEWARK, ARKANSAS.

TRUCK.

935,139.

Specification of Letters Patent. Patented Sept. 28, 1909.

Application filed November 28, 1908. Serial No. 464,938.

*To all whom it may concern:*

Be it known that I, JESSE B. BROWN, a citizen of the United States, residing at Newark, in the county of Independence and State of Arkansas, have invented a new and useful Truck, of which the following is a specification.

This invention relates to a truck designed more particularly for handling or transporting heavy castings such as car couplings, etc., and it has for its object to provide in a truck of this kind improved means for picking up and supporting the load, it being readily picked up, carried to its destination, and automatically discharged.

The invention also has for its object certain novel structural details to be presently described, whereby a truck is had which is strong and durable, and devoid of complicated parts.

With the above objects in view, the invention consists in a novel combination and arrangement of parts to be presently described and claimed, reference being had to the drawings hereto annexed in which—

Figure 1 is a side elevation of the truck loaded, one of the wheels being shown removed. Fig. 2 is a top plan view. Fig. 3 is a transverse section on the line 3—3 of Fig. 2. Fig. 4 is a side elevation showing another application of the invention.

The two wheels 5 of the truck are mounted on an axle 6 to which is secured a pair of plates 7, arranged edgewise and spaced apart at their inner edges, there being upstanding flanges 8 at said edges. Between these flanges there is riveted or otherwise secured a bar 9 which is extended rearwardly at one end at an inclination to form a handle 10 provided at its extremity with a grip 11. The bar 9 is also extended forwardly beyond the flanges 8 to form a track 12 for a purpose to be presently described. The outer end of the track is hook-shaped as indicated at 13.

To the bottom of the plates 7, adjacent to the rear ends thereof, are riveted or otherwise secured plates 14 having at their outer edges depending flanges 15 which are bent outwardly at their lower ends as indicated at 16. In the flanges 15, above the bend 16, is journaled a roller 17.

On the track 12 is mounted a carriage comprising spaced side plates between which, at their upper ends, is mounted a pair of wheels 19 which travel on the upper edge of the part 12, and between the lower ends of said plates, is mounted a single wheel 20 which travels on the lower edge of the part 12. The carriage is prevented from rolling off the track by the hook-shaped end portion 13 thereof.

On the carriage are mounted grab hooks 21 and 22, respectively. The shank of the grab hook 21 is forked at its inner end as indicated at 23, the two branches of the fork extending on opposite sides of the carriage, and being pivotally connected to the axle 24 of the front wheel 19. The shank of the grab hook 22 is connected in a similar manner to the axle 25 of the wheel 20, and said shank is also angular as clearly shown in Fig. 1, the object of which will be presently made clear.

In Fig. 1 I have shown the truck loaded, it being shown as carrying a car coupler. It will be understood, however, that other objects may be carried by the truck with equal facility. The load is mounted on the truck in the following manner: Its front end is tilted downwardly until the grab end is tilted downwardly until the grab hook 22 may be engaged with the rear end of the load, after which the grab hook 21 is thrown over the front end of the load. The bills of the grab hooks are oppositely presented so that the load may be engaged as stated. When the truck is tilted downwardly, the carriage rolls forwardly until it is stopped by the hooked end 13 of the track. After the grab hooks have been engaged with the load as stated, it is lifted by tilting the front end of the truck upwardly, whereupon the carriage rolls rearwardly slightly and the load swings the grab hook 22 rearwardly until it is stopped by its engagement with the lower edge of the track, the angularity of its shank preventing it from swinging so far as to disengage said grab hook from the load. The load is now securely held between the grab hooks, the carriage being held stationary on the track by the engagement of the grab hook 22 therewith, and it can be carried to its destination by pushing the truck thereto. The load is lowered to the ground by tilting the front end of the truck downwardly. By thus tilting the truck, the carriage rolls forwardly, whereupon the grab hooks are automatically released from the load.

Fig. 4 shows the manner in which the truck is used for carrying a coupler with its pocket attached. All couplers are cored throughout their entire length, so that in loading a coupler with its pocket attached as shown in Fig. 4, the handle of the truck is raised, whereupon the carriage rolls down the track 12 against the hook-shaped end 13, and at the same time the grab hook 22 is inserted into the hole at the inner end of the coupler. The handle is then lowered, whereupon the pocket end of the coupler raises first, and is guided onto the roller 17 by the portion 16 of the flanges 15. As the handle continues to lower, the track 12 becomes oppositely inclined, and the carriage, assisted by the roller 17, carries the load back until the carriage strikes the front end of the flanges 8 and the axle 6, and the load becomes practically balanced, after which it can be carried to its destination by pushing the truck thereto. The roller 17 also assists in handling other loads such as car axles, etc.

It will be seen from the foregoing that I have provided a truck which can be quickly and easily operated, and by the frame construction, a structure is had which is strong and rigid and durable, and perfectly adapted for hard usage and handling heavy loads.

What is claimed is:

1. The combination with a truck, of a carriage slidably mounted thereon, and grab hooks pivotally connected to the carriage, at one of the ends and the bottom thereof, respectively.

2. A truck frame comprising a pair of plates placed edgewise, and having upstanding flanges at their inner edges, and a bar secured between said flanges and having a handle extension.

3. In a truck, a frame comprising a pair of plates spaced edgewise, and having upstanding flanges at their inner edges, a bar secured between said flanges, and having at one end a handle extension, and at the other end a track extension, a carriage mounted on the track, and grab hooks pivotally mounted on the carriage.

4. The combination with a truck, of a track thereon, a carriage mounted on the track, and grab hooks pivotally connected to the carriage, the pivotal connection of said hooks being above and below the track respectively.

5. The combination with a truck, of a depending grab hook carried by the front end thereof, and adapted to engage the load intermediate the ends of said load, and means on the bottom of the truck for limiting the upward swing of the rear end of such load.

6. The combination with a truck, of a carriage slidably mounted thereon, a depending hook on the carriage adapted to engage the load intermediate the ends of the same, and means on the truck for limiting the upward swing of the rear end of such load.

7. The combination with a truck, of a carriage slidably mounted thereon, stops on the truck between which the carriage slides, a depending hook on the carriage adapted to engage the load intermediate the ends of the same, and means on the truck for limiting the upward swing of the rear end of such load.

8. The combination with a truck, of a depending grab hook carried by the front end thereof, and adapted to engage the load intermediate the ends of the same, and a transversely extending roller carried by the bottom of the truck, and engageable with the rear end of the load to limit the upward swing thereof.

9. The combination with a truck, of a depending grab hook carried by the front end thereof, and adapted to engage the load intermediate the ends of the same, a transversely extending roller carried by the bottom of the truck, and engageable with the load for limiting the upward swing thereof, and flared guides at the ends of the roller.

In testimony that I claim the foregoing as my own, I have hereto affixed my signature in the presence of two witnesses.

JESSE B. BROWN.

Witnesses:
H. A. GIRL,
R. M. GALLOWAY.